United States Patent
Kroell et al.

(10) Patent No.: US 9,281,775 B2
(45) Date of Patent: Mar. 8, 2016

(54) CLAMPING DEVICE WITH AN ELECTRIC MOTOR

(71) Applicant: Ludwig Ehrhardt GmbH, Laubach (DE)

(72) Inventors: Harald Kroell, Laubach (DE); Stefan Woerner, Muenzenberg (DE); Nikolaus Heidt, Lich (DE)

(73) Assignee: Ludwig Ehrhardt GmbH, Laubach (DE)

( * ) Notice: Subject to any disclaimer, the term of this patent is extended or adjusted under 35 U.S.C. 154(b) by 213 days.

(21) Appl. No.: 14/004,535

(22) PCT Filed: Sep. 19, 2012

(86) PCT No.: PCT/EP2012/003905
§ 371 (c)(1),
(2) Date: Sep. 11, 2013

(87) PCT Pub. No.: WO2013/041219
PCT Pub. Date: Mar. 28, 2013

(65) Prior Publication Data
US 2014/0184106 A1    Jul. 3, 2014

(30) Foreign Application Priority Data
Sep. 19, 2011   (DE) .......................... 10 2011 113 765

(51) Int. Cl.
*H02P 29/00* (2006.01)
*B25B 1/18* (2006.01)
*B25B 5/06* (2006.01)

(52) U.S. Cl.
CPC .............. *H02P 29/0033* (2013.01); *B25B 1/18* (2013.01); *B25B 5/06* (2013.01)

(58) Field of Classification Search
CPC .............. B25B 1/125; B25B 1/10; B25B 5/10
See application file for complete search history.

(56) References Cited

U.S. PATENT DOCUMENTS

| | | | |
|---|---|---|---|
| 4,351,516 | A | 9/1982 | Ersoy et al. |
| 5,626,055 | A | 5/1997 | Fukui |

(Continued)

FOREIGN PATENT DOCUMENTS

| | | |
|---|---|---|
| DE | 3031368 A1 | 2/1982 |
| DE | 3334401 A1 | 4/1985 |

(Continued)

OTHER PUBLICATIONS

International Search Report for PCT/EP2012/003905 dated Jan. 2, 2013.

*Primary Examiner* — Lee D Wilson
(74) *Attorney, Agent, or Firm* — Caesar Rivise, PC

(57) ABSTRACT

The invention relates to a clamping device (1), for example swing tensioners (1), bracing elements, machine vises or block cylinders, with a movable clamping element (2) for clamping a workpiece with a defined clamping force, and with an electric motor (10) for mechanically driving the clamping element (2), also with a control unit that controls the electric motor (10). The invention provides that the control unit detects an electrical operating parameter of the electric motor (10) as a measure of the clamping force. The contact of the clamping element with the workpiece is detected in this manner. Subsequently, the electric motor (10) is then driven further by a defined number of revolutions, the number of revolutions after contact with the workpiece defining the clamping force. The invention further comprises a corresponding control method.

24 Claims, 10 Drawing Sheets

(56) References Cited

U.S. PATENT DOCUMENTS

| | | | |
|---|---|---|---|
| 5,657,538 A * | 8/1997 | Ishii | B23P 19/10 198/345.1 |
| 6,035,775 A * | 3/2000 | Nghiem | B21D 39/046 100/233 |
| 6,456,026 B1 | 9/2002 | Morel et al. | |
| 6,726,823 B1 * | 4/2004 | Wang | B23H 5/08 204/224 M |
| 7,603,930 B2 * | 10/2009 | Kato | B23Q 1/5437 269/58 |
| 2003/0085502 A1 * | 5/2003 | Migliori | B25B 5/12 269/228 |
| 2003/0214087 A1 * | 11/2003 | Grosso | B23Q 3/18 269/71 |
| 2005/0027389 A1 * | 2/2005 | Hadaway | B27B 27/10 700/159 |
| 2011/0214540 A1 | 9/2011 | Grob | |
| 2011/0215511 A1 | 9/2011 | Grob | |
| 2011/0217136 A1 | 9/2011 | Hobel et al. | |
| 2012/0299232 A1 * | 11/2012 | Kawamura | G05B 19/404 269/58 |
| 2012/0326402 A1 * | 12/2012 | Grob | B23Q 1/0009 279/134 |
| 2014/0184106 A1 * | 7/2014 | Kroell | B25B 1/18 318/6 |

FOREIGN PATENT DOCUMENTS

| | | |
|---|---|---|
| DE | 3638526 C1 | 7/1987 |
| DE | 19517345 A1 | 11/1995 |
| DE | 19752671 A1 | 6/1999 |
| DE | 10205601 A1 | 8/2003 |
| DE | 10252549 A1 | 5/2004 |
| DE | 102010044783 A1 | 9/2011 |
| EP | 0268176 A1 | 11/1987 |
| EP | 0919729 A2 | 9/1998 |
| EP | 1334803 A2 | 8/2003 |
| EP | 1533080 A2 | 5/2005 |
| FR | 2776858 A1 | 3/1998 |
| WO | 2006030520 A1 | 3/2006 |

* cited by examiner

Section A-A

Section B-B

CLAMPING DEVICE WITH AN ELECTRIC MOTOR

BACKGROUND OF THE INVENTION

The invention relates to a clamping device, such as for example a swing clamp, a machine vice, a support element or a block cylinder. Clamping devices of this type are for example known from DE 102 05 601 A1, DE 102 52 549 A1, DE 33 34 401 A1 and DE 197 52 671 A1, wherein clamping devices of this type have hitherto for the most part been driven hydraulically and have position sensors which determine the position (clamped or unclamped) of the clamping device. Furthermore, it is known from the prior art to drive clamping devices of this type by means of an electric motor, wherein hitherto position sensors were however likewise used in order to determine the position (clamped resp. unclamped) of the clamping device.

The disadvantage of these known clamping devices is therefore the fact that separate position sensors are necessary for determining the position (clamped resp. unclamped).

A clamping device is known from DE 195 17 345 A1, in which the clamping element is driven by an electric motor. Here, the clamping force of the clamping device can be calculated from the torque and thus from the current consumption of the electric motor. The electric motor can then be switched off if the current consumption reaches a certain predetermined value, which corresponds to the desired clamping force. This method requires, however, a very precise and dynamic measurement of the current consumption.

Reference is also to be made to DE 10 2010 044 783 A1, DE 36 38 526 C1 and DE 30 31 368 A1 concerning the prior art.

The object of the invention is therefore to improve the known clamping devices accordingly.

This object is achieved by means of a clamping device according to the invention and by means of a corresponding operating method.

DESCRIPTION OF THE INVENTION

The invention is based on the technical insight that in the case of an electric motor driven clamping device, the electrical operating values (e.g. the motor current) of the electric motor used as drive allow a conclusion about the mechanical loading of the electric motor and thus also about the clamping force acting on the clamping element.

The invention therefore comprises the general technical teaching of measuring the electrical operating variables of the electric motor used as drive as a measure for the clamping force, in order to deduce therefrom when the clamping element runs onto the workpiece during a clamping procedure.

After the running onto the workpiece, the number of revolutions of the electric motor is then counted in order to derive the clamping force therefrom. When the desired clamping force is reached, the electric motor can then be switched off. Thus, to determine the switch off point, the number of revolutions of the electric motor since the running onto the workpiece just has to be counted. However, measuring the current consumption is not absolutely necessary to this end.

The clamping device according to the invention comprises a movable clamping element for clamping a workpiece with a certain clamping force. Furthermore, the clamping device according to the invention has an electric motor for the mechanical drive of the clamping element, wherein a control unit is provided, which controls the electric motor. The invention then provides for the control unit to detect an electrical operating variable (e.g. motor current) of the electric motor as a measure for the clamping force.

According to the invention, the clamping device has a first spring element (e.g. a disk spring pack), which is loaded during a clamping procedure and relaxed during an unclamping procedure.

Here, provision is advantageously made for the clamping element to be moved in a certain clamping direction during a clamping procedure, wherein the first spring element presses the clamping element either in the clamping direction or counter to the clamping direction (e.g. in the case of a swing clamp) with a certain spring force, so that the spring force of the first clamping element is essentially equal to the clamping force which the clamping element exerts onto the workpiece.

Preferably, a second spring element is additionally provided, which is loaded during an unclamping procedure and relaxed during a clamping procedure, wherein the second spring element forms a frictionally engaged connection between the electric motor and the clamping element in the case of an unclamping procedure.

In a preferred exemplary embodiment of the invention, the clamping device is a swing clamp, wherein the clamping element can be displaced along a clamping direction for clamping or unclamping the workpiece, whereas the clamping element can be pivoted, particularly at right angles to the clamping direction, in the unclamped state. Here, the frictionally engaged connection between the electric motor and the clamping element effects a pivoting movement of the clamping element in connection with the rotational movement of the electric motor.

Furthermore, the clamping device preferably has a spindle drive. The spindle drive comprises an axially displaceable piston which carries the clamping element as well as a spindle nut connected to the piston. Furthermore, the spindle drive comprises a spindle, which is rotatably driven by the electric motor and engages into the spindle nut and converts a rotational movement of the electric motor into a linear movement of the piston and thus also of the clamping element.

Further, a sliding control is preferably provided, which only allows one pivoting movement of the clamping element at the start of a clamping procedure and at the end of a clamping procedure and otherwise only allows a linear movement of the clamping element.

In the context of the invention, various possibilities exist for the design construction of the clamping device. Thus, the principle according to the invention can for example be realized in the case of swing clamps, support elements, machine vices or block cylinders.

It is further to be mentioned that the electrical operating variable of the electric motor measured as a measure for the clamping force is preferably the motor current. However, within the context of the invention, other electrical operating variables, which allow a conclusion about the mechanical loading, can also be measured.

In a preferred exemplary embodiment of the invention, provision is made for the control unit to end a clamping procedure depending on the measured electrical operating variable of the electric motor, wherein the clamping procedure is ended when the measured electrical operating variable corresponds to the desired clamping force.

If the clamping device runs onto the workpiece to be clamped by means of the clamping element, then the spring element is strained and the current drawn by the electric motor increases. This current increase is preferably analyzed, as it indicates the running of the clamping device onto the workpiece and thus the beginning of the actual clamping procedure. In the following clamping procedure, the first spring element is then strained, wherein the revolutions of the electric motor are counted. Subsequently, the clamping force can then be calculated from the number of revolutions of the electric motor in accordance with the running on and the known spring characteristic. The clamping force can as a result be used as a control variable, measuring variable and variable for a re-adjustment. For example, this allows the following variants of the invention:

varying the clamping force by specifying a set point value, determining the actual clamping force, re-adjusting the clamping force in the clamped state in the case of external influences, such as vibrations for example.

Furthermore, provision is preferably made for the control unit to end an unclamping procedure depending on the measured electrical operating variable of the electric motor, wherein the unclamping procedure is ended when the measured electrical operating variable corresponds to a desired friction force of the frictionally engaged connection between the electric motor and the clamping element.

The previously mentioned spring elements are preferably disk spring packs; however, the invention can fundamentally also be realized with other spring types.

Further, the clamping device can have a structurally integrated current storage device (e.g. rechargeable battery), in order to allow a network-independent power supply of the electric motor at least temporarily.

In a preferred exemplary embodiment, the clamping device comprises a printed circuit board, on which the control unit is arranged, wherein the printed circuit board is folded around the electric motor, which advantageously leads to space saving.

Furthermore, the clamping device can have an output for outputting the clamping force or the clamping path, which is deduced from the measured operating variable.

Further, the invention also comprises a corresponding control method for a clamping device.

In the case of a swing clamp, the following steps are preferably executed during a clamping procedure:
  starting the electric motor with a low rotational speed for pivoting the clamping element into the clamping position utilizing a frictionally engaged connection between electric motor and clamping element,
  operating the electric motor with a low rotational speed for releasing a frictionally engaged connection between the electric motor and the clamping element, and/or
  measuring the electrical operating variable of the electric motor during the clamping procedure, and/or
  checking whether the measured electrical operating variable indicates that the frictionally engaged connection between the electric motor and the clamping element is released, and/or
  increasing the rotational speed of the electric motor when the frictionally engaged connection between the electric motor and the clamping element is released, and/or
  measuring the electrical operating variable of the electric motor during the clamping procedure, and/or
  checking whether the measured electrical operating variable indicates that the clamping element has run onto the workpiece, and/or
  reducing the rotational speed of the electric motor if the clamping element has run onto the workpiece,
  straining the spring element,
  measuring the electrical operating variable of the electric motor during the clamping procedure, and/or
  checking whether the measured electrical operating variable indicates that the desired clamping force has been reached,
  switching off the electric motor if the desired clamping force has been reached.

Furthermore, in the case of a swing clamp, the following steps are preferably executed during an unclamping procedure:
  starting the electric motor with a low rotational speed for reducing the clamping force, and/or
  measuring the electrical operating variable of the electric motor during the unclamping procedure, and/or
  checking whether the measured electrical operating variable indicates that the clamping force is decreased, and/or
  increasing the rotational speed of the electric motor if the clamping force is decreased, and/or
  measuring the electrical operating variable of the electric motor during the unclamping procedure, and/or
  increasing the frictional engagement between the electric motor and clamping element by straining the spring element, and/or
  pivoting the clamping element into the unclamping position with a low rotational speed, and/or
  further increasing the frictional engagement between the electric motor and clamping element, and/or
  checking whether the measured electrical operating variable indicates that the frictionally engaged connection between the electric motor and the clamping element has a desired friction force, and/or
  switching off the electric motor if the desired friction force has been reached.

In the case of a block cylinder, the following steps are preferably executed during a clamping procedure:
  starting the electric motor with a low rotational speed for releasing a frictionally engaged connection between the electric motor and the clamping element, and/or
  measuring the electrical operating variable of the electric motor during the clamping procedure, and/or
  checking whether the measured electrical operating variable indicates that the frictionally engaged connection between the electric motor and the clamping element is released, and/or
  increasing the rotational speed of the electric motor when the frictionally engaged connection between the electric motor and the clamping element is released, and/or
  measuring the electrical operating variable of the electric motor during the clamping procedure, and/or
  checking whether the measured electrical operating variable indicates that the clamping element has run onto the workpiece, and/or
  reducing the rotational speed of the electric motor if the clamping element has run onto the workpiece,
  straining the spring element,
  measuring the electrical operating variable of the electric motor during the clamping procedure, and/or
  checking whether the measured electrical operating variable indicates that the desired clamping force has been reached,
  switching off the electric motor if the desired clamping force has been reached.

In contrast, in the case of a block cylinder, the following steps are preferably executed for unclamping:
  starting the electric motor with a low rotational speed for reducing the clamping force, and/or
  measuring the electrical operating variable of the electric motor during the unclamping procedure, and/or checking whether the measured electrical operating variable indicates that the clamping force is decreased, and/or increasing the rotational speed of the electric motor if the clamping force is decreased, and/or measuring the electrical operating variable of the electric motor during the unclamping procedure, and/or straining the spring element, measuring the electrical operating variable of the electric motor during the unclamping procedure, and/or checking whether the measured electrical operating variable indicates that the desired unclamping force has been reached, switching off the electric motor if the desired unclamping force has been reached.

In the case of a machine vice, the following steps are preferably executed during a clamping procedure:

starting the electric motor with high rotational speed, and/or measuring the electrical operating variable of the electric motor during the clamping procedure, and/or checking whether the measured electrical operating variable indicates that the clamping element has run onto the workpiece, and/or reducing the rotational speed of the electric motor if the clamping element has run onto the workpiece, straining the spring element, measuring the electrical operating variable of the electric motor during the clamping procedure, and/or checking whether the measured electrical operating variable indicates that the desired clamping force has been reached, switching off the electric motor if the desired clamping force has been reached.

In the case of an unclamping procedure of a machine vice, the following steps are preferably executed:

starting the electric motor with a low rotational speed for reducing the clamping force, and/or measuring the electrical operating variable of the electric motor during the unclamping procedure, and/or checking whether the measured electrical operating variable indicates that the clamping force is decreased, and/or increasing the rotational speed of the electric motor if the clamping force is decreased, and/or measuring the electrical operating variable of the electric motor during the unclamping procedure, and/or traveling into the unclamping position, defined via the path resp. by means of a limit switch, switching off the electric motor.

In the case of a clamping procedure of a support element, the following steps are preferably executed:

starting the electric motor with high rotational speed, and/or measuring the electrical operating variable of the electric motor during the setup procedure, and/or reducing the rotational speed of the electric motor when the advance switching position is reached, measuring the electrical operating variable of the electric motor during the setup procedure, and/or checking whether the measured electrical operating variable indicates that the clamping element has run onto the workpiece, if so, immediate switching off of the electric motor, and/or checking whether the friction coupling has responded, if so, immediate switching off of the electric motor.

In contrast, the following steps are preferably executed for unclamping a support element:

starting the electric motor with high rotational speed for reducing the contact force, and/or measuring the electrical operating variable of the electric motor during the unclamping procedure, and/or traveling to the unclamping position, defined by a limit switch, switching off the electric motor.

BRIEF DESCRIPTION OF THE DRAWINGS

Other advantageous developments of the invention are characterized in the subclaims or are explained in more detail below together with the description of the preferred exemplary embodiments of the invention on the basis of the figures. The figures show as follows:

FIGS. 1A-1C show various views of a swing clamp 1 according to the invention, which consists of a plurality of components which are described in the following.

Figure 1A:
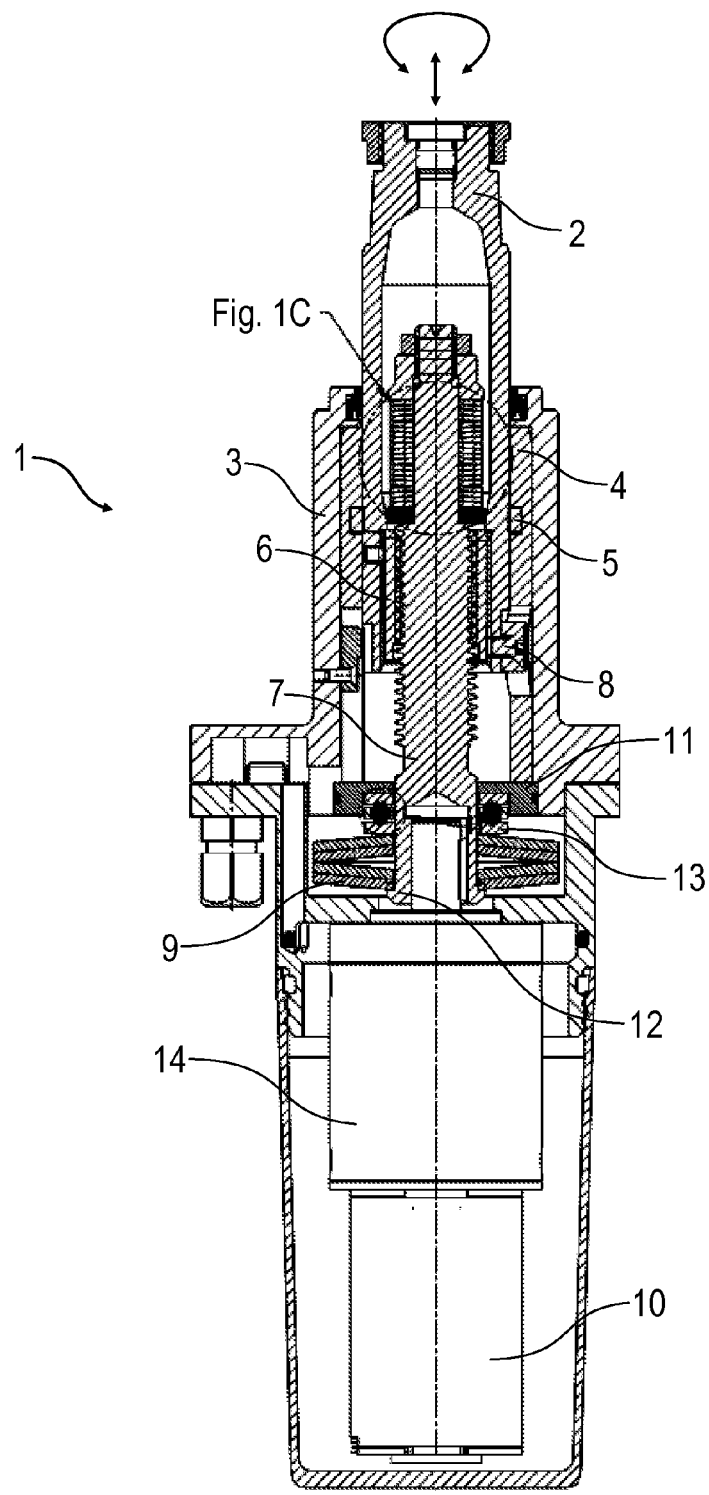
FIG. 1A a cross-sectional view through a swing clamp according to the invention, FIG. 1B a perspective view of the swing clamp from FIG. 1A, FIG. 1C a detailed view from FIG. 1A in the region of a disk spring pack, FIG. 2A a cross-sectional view through a support element according to the invention along the section line A-A in FIG. 2D, FIG. 2B a cross-sectional view through a support element according to the invention along the section line B-B in FIG. 2E, FIG. 2C a perspective view of the support element from FIGS. 2A-2B, FIG. 2D a view onto the support element according to FIGS. 2A-2C, FIG. 3A a perspective view of a machine vice according to the invention, FIG. 3B a cross-sectional view of the machine vice according to FIG. 3A, FIG. 4A a perspective view of a block cylinder according to the invention, FIG. 4B a cross-sectional view of the block cylinder according to FIG. 4A, FIG. 5A a flow chart for clarifying a clamping procedure of the swing clamp from FIGS. 1A-1C, FIG. 5B a flow chart for clarifying an unclamping procedure of the swing clamp from FIGS. 1A-1C.
Figure 1B:
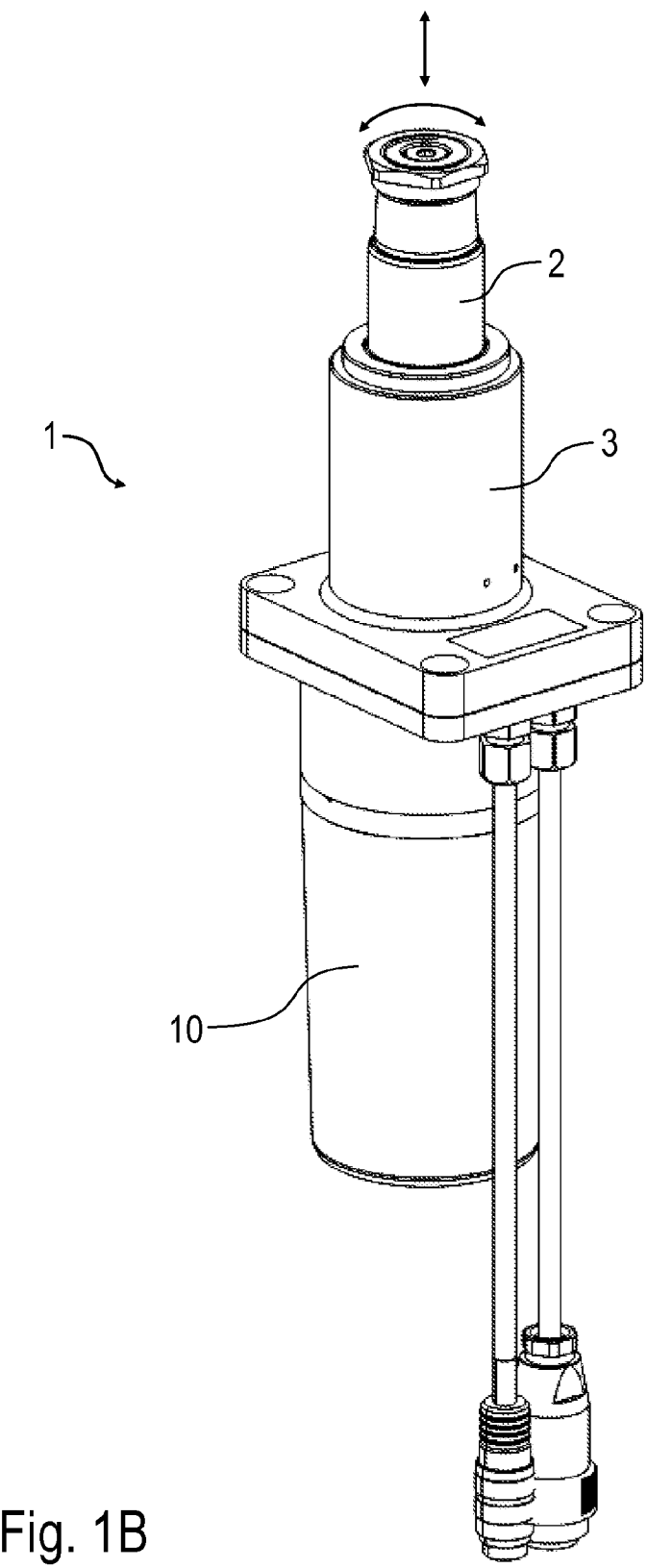
Figure 1C:
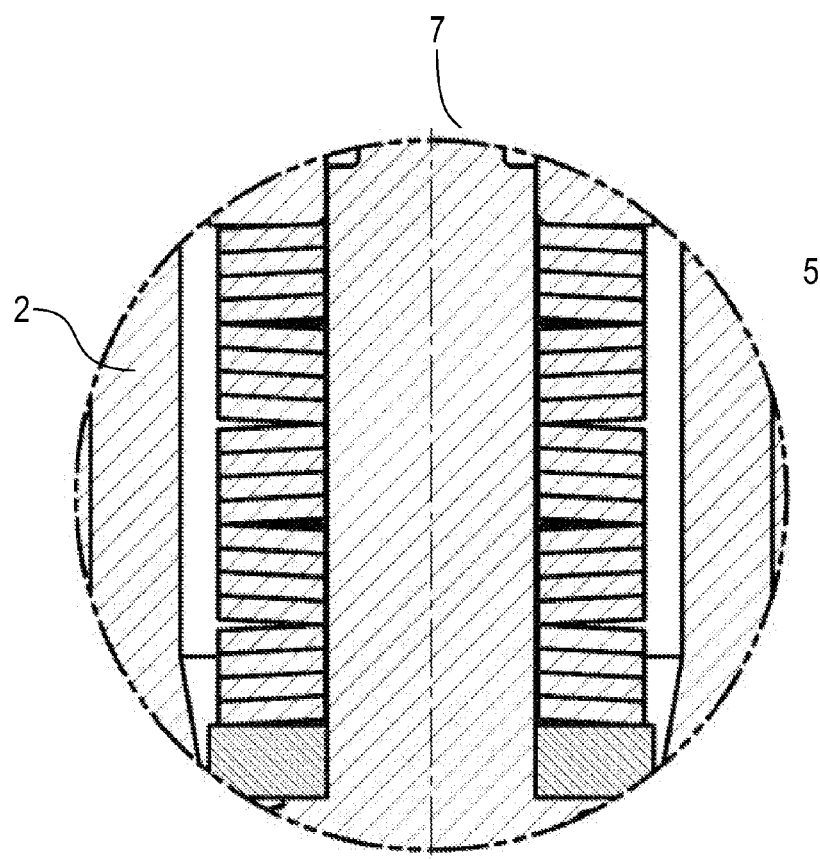
Figure 2A:
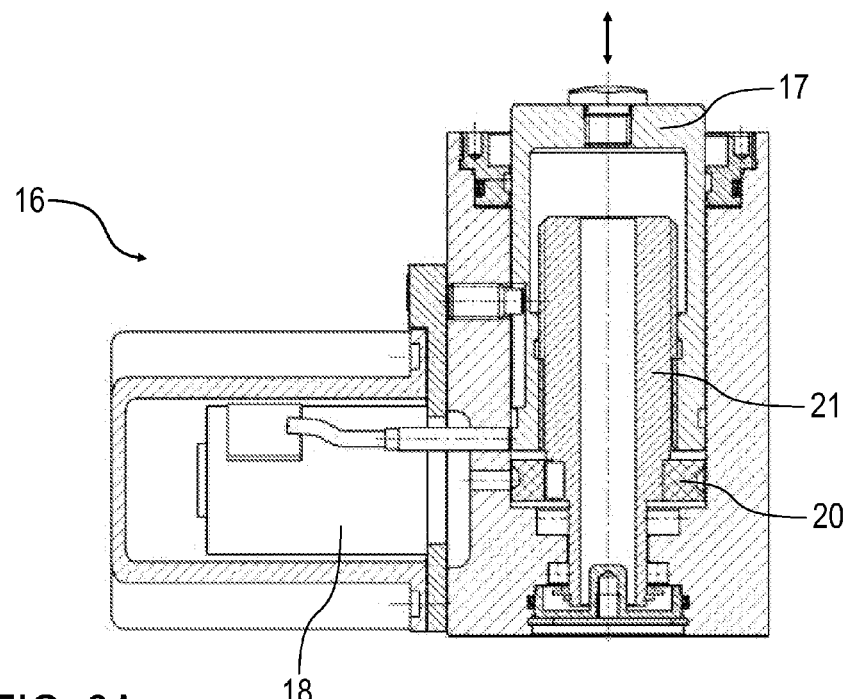
Figure 2B:
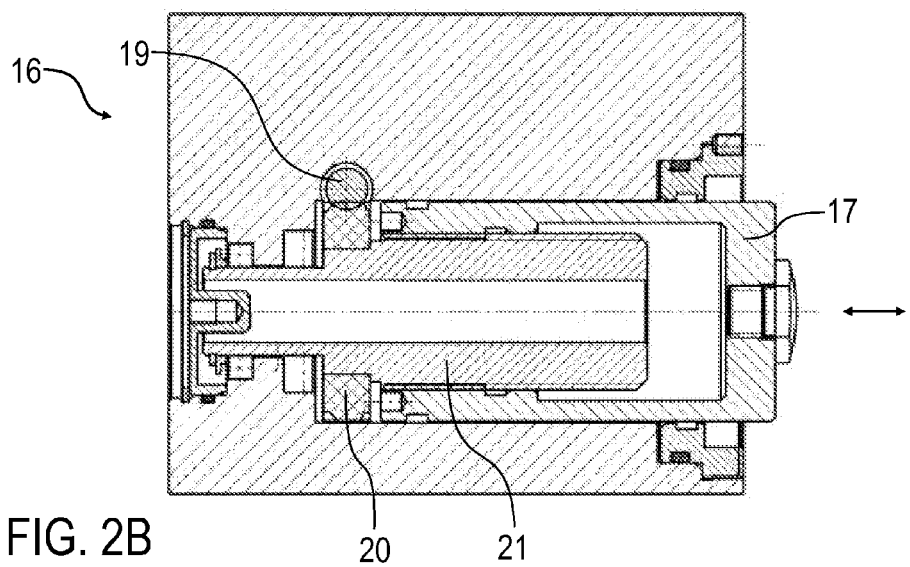
Figure 2C:
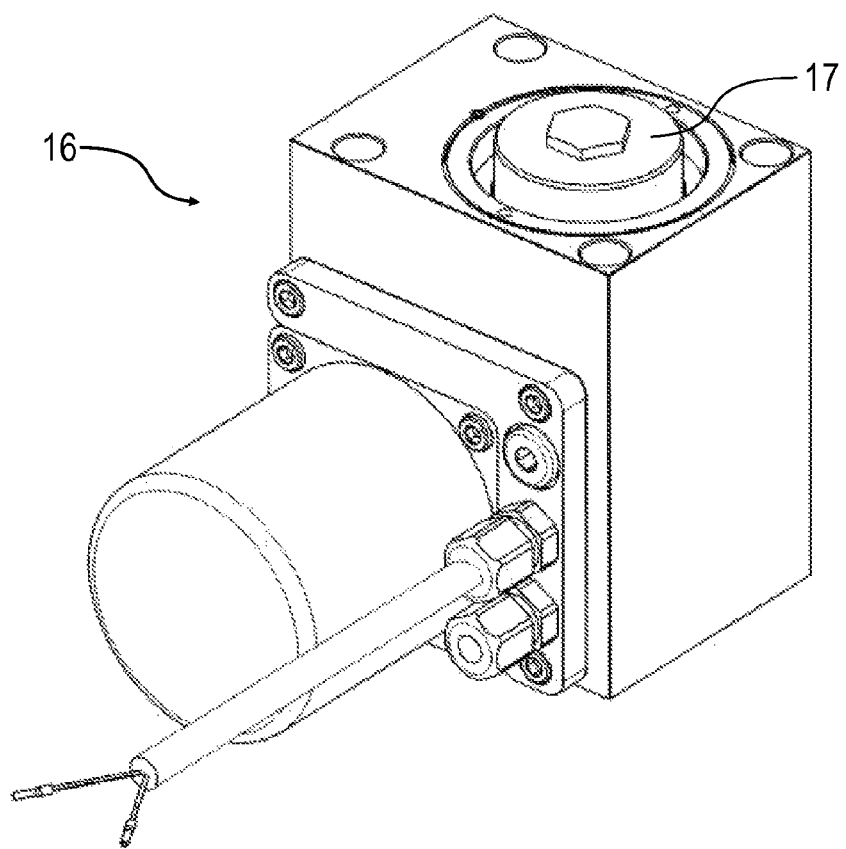
Figure 2D:
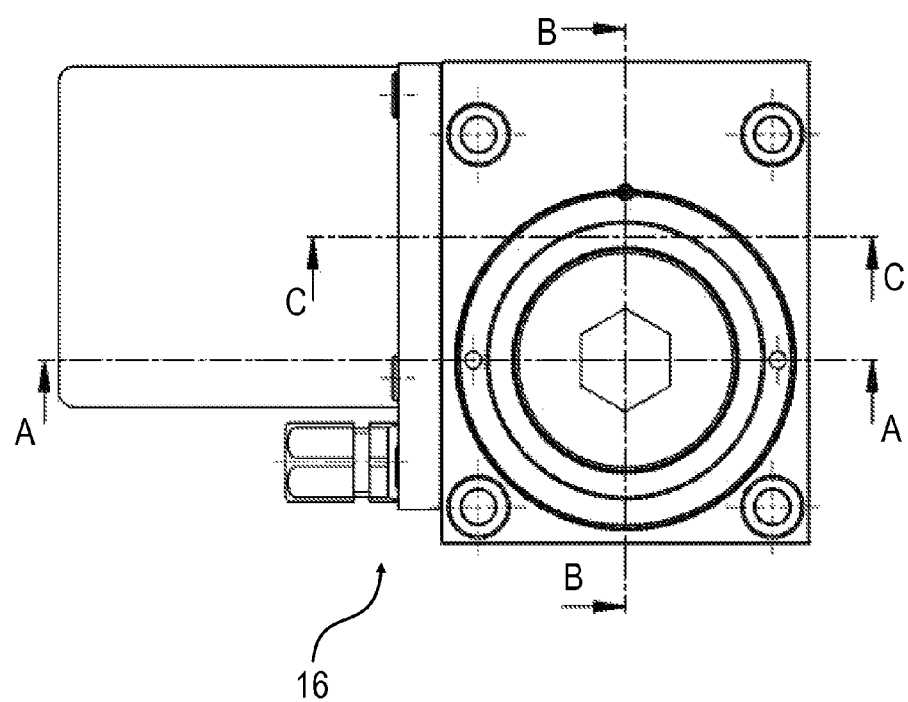

A so-called guide module essentially consists of a piston 2 and an associated sliding block guide. An optimal guiding means that a good efficiency and low frictional losses exist. The guiding of the piston 2 takes place via a guide bushing 4 pressed into the housing 3.

A greased felt ring 5 is additionally used to minimize friction. The felt ring 5 lubricates the guiding surface of the piston 2 continuously during each stroke. The permanent lubrication of the guiding surface reduces the friction between the contact surfaces of the piston 2 and the guide bushing 4 in addition to the self-lubricating properties thereof.

A sliding block guide, which is integrated into the guide bushing 4 takes on the guiding of the piston 2 against rotation in the clamping region and also the guiding and limiting of the pivot movement. The sliding block guide is necessary so that the clamp which can be fastened on the piston 2 in any desired angular position can assume a defined position which remains constant in every cycle. In the case of an unguided piston 2, in contrast, an undefined position of the clamp would result due to the freedom of movement of the spindle nut drive and clamping which is always directed to the same point would no longer be possible. This can be explained in that a spindle nut 6 is securely connected to the piston 2 and thus must necessarily execute the same movements. That means that in the case of an executed axial movement, an uncertain rotational movement, caused by friction between the spindle nut 6 and a spindle 7, also always materializes. A sliding block 8 sits on the piston 2 and guides the piston 2 through the groove in the guide bushing 4. The movement created is axial until the sliding block 8 is released in the pivot groove and thus allows a pivot movement created by the spindle friction. The sliding block 8 runs against a stop defined by the desired pivot angle. There, the spindle 7, the spindle nut 6 and the disk springs 9 are tightened against one another. The friction between the spindle 7 and the spindle nut 6 is increased considerably by means of the tightening and thus a frictionally engaged connection is produced. This frictional engagement means that the piston 2 follows the rotational movement of the spindle 7 and thus carries out the pivot movement.

A further module of the swing clamp 1 essentially comprises the spindle nut drive with further functional components.

The spindle nut drive is the moving element of the electromechanical swing clamp 1. The spindle 7 is driven by an electric motor 10. The spindle nut 6, which is securely connected to the piston 2, travels downward during clamping and upward during unclamping. The spindle nut 6 is screwed into the piston 2 by means of a fine thread. The spindle nut 6 runs during unclamping onto a washer 11 and presses the disk springs 9 together. The compression of the disk springs 9 effects a higher current consumption of the electric motor 10. The control recognizes this and brakes the electric motor 10. Thus, running hard against the block is prevented.

In the region of the nut movement, a lubricant is pushed back and forth, which should keep the friction between spindle 7 and spindle nut 6 low. Due to the movement of the lubricant, a permanent wetting of the spindle 7 with lubricant is achieved. The lubricant is poured in during the assembly and can, if required, be re-lubricated through a hole closed with a sealing screw.

When clamping, the spindle nut 6 runs onto the washer 11 and as a result the spindle 7 is pulled upward. The spindle 7 is securely connected to a motor shaft bushing 12, i.e. when the spindle 7 pulls upward, the motor shaft bushing 12 is also pulled upward. The motor shaft bushing 12 is supported via the disk springs 9, a deep groove ball thrust bearing 13 and the washer 11 on the housing 3. The compression of the lower disk springs 9 also prevents running hard against the block, as described above.

A further module of the swing clamp 1 according to the invention is the drive unit which has the electric motor 10, downstream of which a gear transmission 14 is connected. The shaft going off at the gear transmission 14 transmits the torque via a shaft/hub connection to the motor shaft bushing between the motor shaft and spindle 7. The rotational movement of the motor shaft is converted into a linear movement, the extension resp. retraction of the piston 2, by means of the spindle nut drive.

Figure 5A:
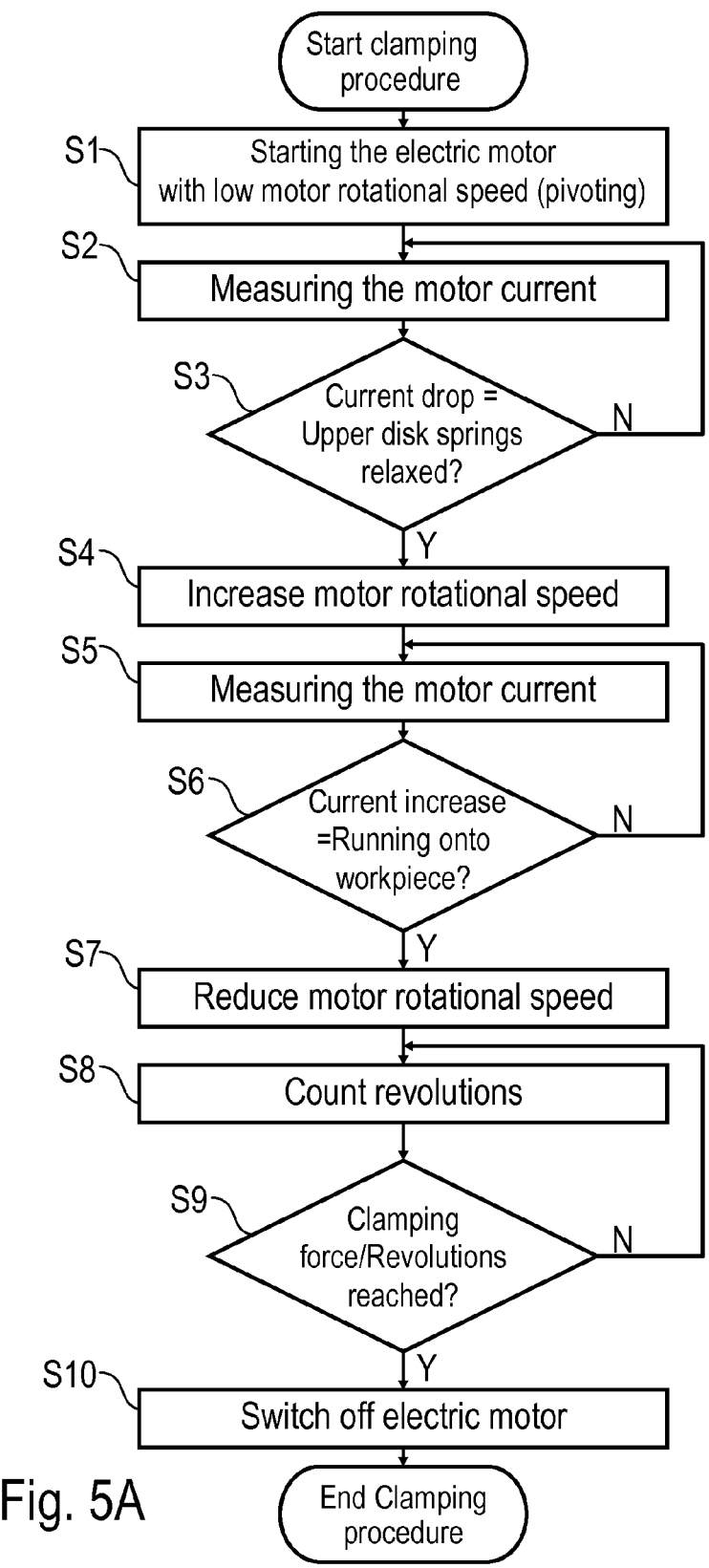
Figure 5B:
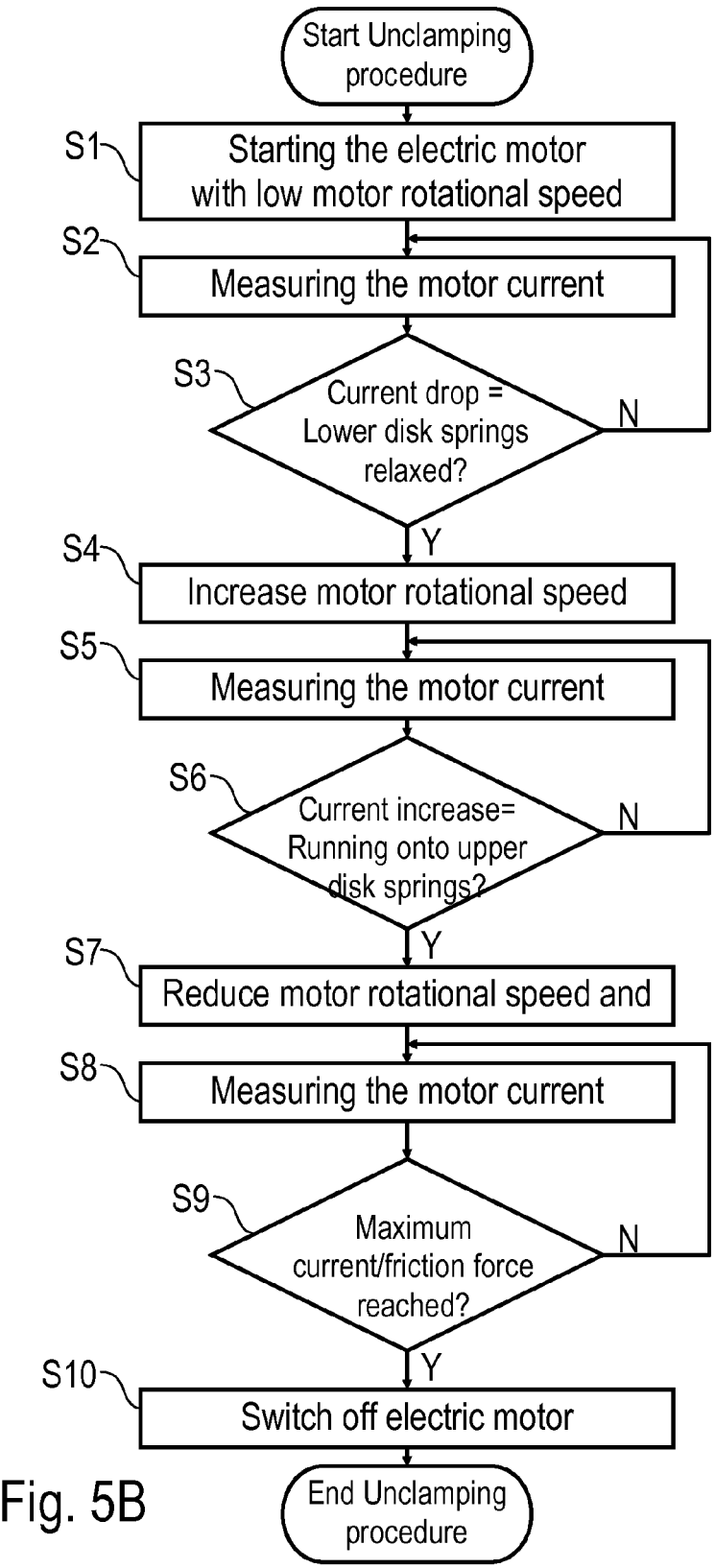

In the following, a clamping procedure of the swing clamp 1 according to the invention is first described, wherein reference is made to the flow chart according to FIG. 5A.

During the clamping procedure of the electromechanical swing clamp 1, a workpiece (not illustrated) is clamped onto a workbench (not illustrated). Here, the following work steps take place: In the initial position, the electromechanical swing clamp 1 is in the unclamped position and the spindle nut 6 is tightened against upper disk springs 15. The electric motor 10 transmits the torque by means of the shaft/hub connection to the motor shaft bushing 12 and thus to the spindle 7. The electric motor 10 rotates initially (step S1) with low rotational speed, wherein the motor current is measured (step S2). Due to the frictionally engaged connection between the spindle 7 and the spindle nut 6, the piston 2 pivots with the clamp (not illustrated) attached on the piston 2 into the clamping position. The sliding block 8 in the guide defines the end points of the pivot movement. Due to the stopping of the sliding block 8, the pivot movement is ended and as a result, the piston 2 carries out an axial stroke which releases the frictionally engaged connection (step S3). The electric motor 10 runs further with high rotational speed (step S4), wherein the motor current is measured continuously (step S5), until the piston 2 runs together with the clamp mounted thereon onto the workpiece to be clamped (step S6). As a result, there is a higher current consumption and the rotational speed is reduced by the control (step S7). Due to the running onto the workpiece, the spindle 7 and thus also the motor shaft bushing 12 screwed securely thereon are pulled upward on the transmission output shaft. The clamping force achieved thereby is conducted via the disk springs 9 sitting on the shoulder of the motor shaft bushing 12 and the deep groove ball thrust bearing 13 via the washer 11 onto the housing 3. The clamping force is absorbed completely by the housing 3 and not by the electric motor 10. The drive runs until a desired clamping force has been reached, which corresponds to a certain number of revolutions from the running onto the workpiece (step S9). Thereafter, the electric motor 10 is switched off and the clamping procedure is ended (step S10). The pitch of the spindle 7 and spindle nut 6 is designed to be self-locking, as a result the clamping force is retained without supplying power.

An unclamping procedure of the swing clamp 1 according to the invention is now described in the following.

During unclamping, the electric motor 10 initially runs with low rotational speed, in order to increase the prestress of the lower disk springs 9 (step S1), wherein the motor current is measured continuously. After the release (step S3), the electric motor 10 rotates with high rotational speed (step S4) and the piston 2 carries out an axial stroke. The spindle nut 6 with the piston 2 runs along the sliding block guide onto the upper disk springs 15 (step S6) and the rotational speed is reduced (step S7). The spindle nut 6 is tightened against the upper disk springs 15. The friction between the spindle 7 and the spindle nut 6 is increased considerably by means of the tightening and thus a frictionally engaged connection is produced. This frictional engagement means that the piston 2 follows the rotational movement of the spindle 7 and thus carries out the pivot movement of the piston 2 with the clamp fastened thereon. The clamp pivots utilizing this friction by the required pivot angle and the sliding block 8 strikes the pivot nut at the end. After the pivot nut end has been reached, the spring travel is utilized in order to tighten the spindle nut 6. The friction effect resulting therefrom is required during the clamping procedure for pivoting the clamp back. The drive runs until a current consumption which corresponds to the desired friction force is reached (S9). Thereafter, the electric motor 10 is switched off and the unclamping procedure is ended (step S10).

Characteristic features of the disk springs 9, 15 are now described in the following.

The disk springs 9, 15 are conical ring shells which are loaded in the axial direction as individual disks or combined to form spring packs and spring columns. In design, the disk springs 9, 15 are constructed as disk spring packs. The spindle nut 6 runs onto the lower disk springs 9 during clamping, whereas the spindle nut 6 runs onto the upper disk springs 15 during unclamping. If the electric motor 10 runs onto the lower disk springs 9, an increased force requirement results at the spindle 7. This requires a higher current which is reported to the control. The control reacts thereto and switches the electric motor 10 off within the spring travel. The running against the block, which is otherwise hard and connected with large component loads, is therefore staved off. After the braking of the electric motor 10, travel is carried out with a lower running speed and thus lower motor rotational speed to the required clamping force. Here, the disk spring 9 maintains the required clamping force. In addition, any setting losses which arise due to external influences, such as e.g. different temperatures are compensated. The disk springs 9 are used for maintaining the clamping force which should remain at a constant level at every point of clamping. A further task of the disk springs 9 is the absorption of the moment of inertia arising in the case of the electric motor 10. In this case, the components are protected from loads which are too large when the clamp impinges onto the workpiece. The spring travel gives the control time to regulate the run and as a result prevents loads which are too large, which considerably increases the service life of the entire swing clamp 1. The same requirements apply for the upper disk springs 15 as for the lower disk springs.

In the following, a support element 16 according to the invention is now described, which is illustrated in the FIGS. 2A-2D.

The support element 16 is used for stabilizing workpieces by placing a bolt on variable surfaces.

In this case, the support element 16 should to the greatest extent possible not deform the workpiece, but support the same during processing with high force.

An electromechanically driven piston 17 runs the workpiece on linearly with low force and is then stopped. A self-locking spindle drive enables a high supporting force with low resilience, which is also maintained after isolation from the power network. The drive of the electromechanical support element 16 takes place via an electric motor 18 with a worm shaft 19, downstream of which a worm wheel 20 is connected. The spindle 21 connected to the worm wheel 20 transmits the torque to the spindle nut on the inside of the piston 17. This then executes a linear movement. The piston 17 connected to the spindle nut is therefore extended resp. retracted. The retracted position of the piston 17 is determined by means of a proximity switch. Before the actual supporting procedure, the piston 17 approaches in manual operation up to a short distance from the workpiece. This position is stored in the control as advance switching point. In the operation, the piston 17 is extended at high speed as far as the advance switching point. Thereafter, the piston 17 approaches the workpiece with reduced speed. In the process, the control notices the current increase and brakes the electric motor 18 in a controlled manner when the preset current consumption value is reached. This function can be supported or replaced by means of a mechanical coupling, which is located between the spindle 21 and the worm wheel 19. The coupling is designed in such a manner that the linear movement of the piston 17 is interrupted when a low pre-clamping force is reached. In this case, the response of the coupling is detected by the control and the electric motor 18 is switched off. After the workpiece has been processed, the piston 17 is run back as far as the proximity switch. In the loaded state, the stable self-locking spindle drive takes on the high supporting force and transmits the same to the housing via a running disk. This design leads to a low resilience of the support element.

Figure 3A:
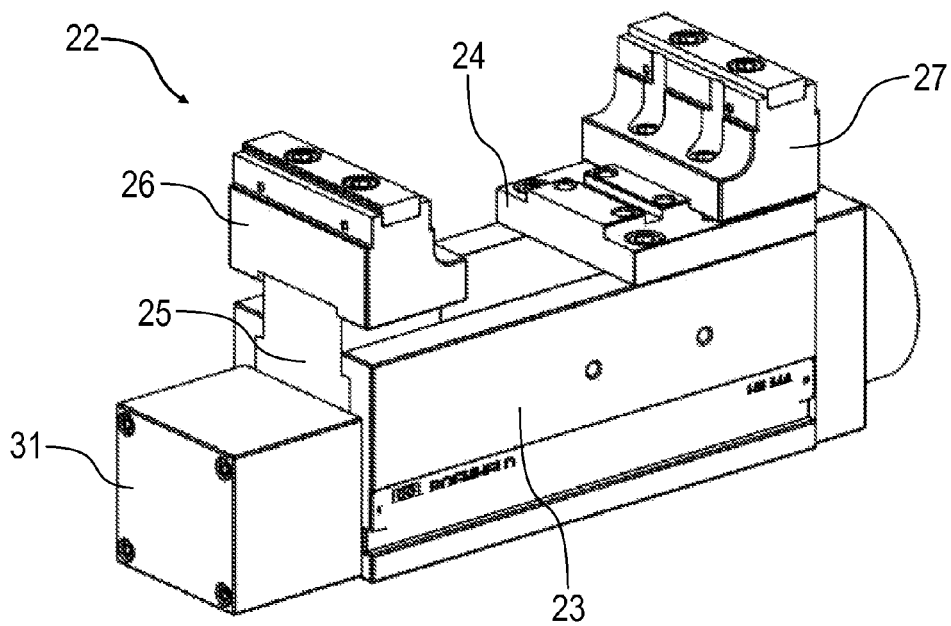
Figure 3B:
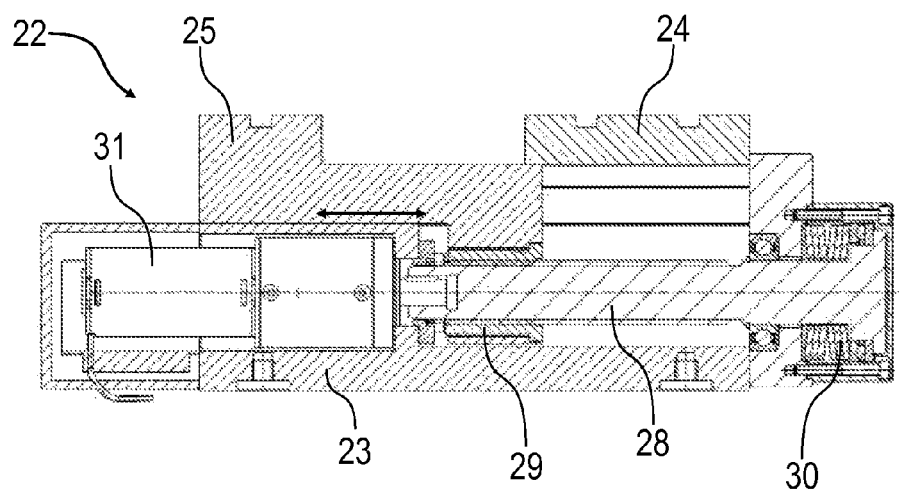

In the following, a machine vice 22 (vice) according to the invention is described, which is illustrated in the FIGS. 3A and 3B.

The machine vice 22 consists of a U-shaped base body 23, on which a clamping jaw fixture 24 is fastened. The base body is used as guide for a movable slide 25. Exchangeable jaws 26, 27 are mounted onto this basic construction, with the aid of which prismatic parts can be clamped, preferably for cutting processing on machine tools.

The delivery of the slide 25 and the creation of the clamping force takes place via a nut/spindle drive with a spindle 28 and a spindle nut 29. The spindle nut 29 is securely fixed in the slide 25. The drive of the spindle 28 takes place via an electric motor 31 with a gear transmission. The electric motor 31 is arranged in a space-saving manner below the slide 25. The electric motor 31 is realized as electric motor 31 with integrated rotary encoder. The unclamping position of the spindle drive is monitored via a limit switch. This limit switch is also used as reference point for the travel. The clamping of workpieces takes place within the travel. When positioning onto the workpiece, the clamping force is built up via the disk springs 30. To this end, the spindle 28 is mounted axially in a displaceable manner. This prevents an abrupt stopping of the electric motor 31 during placing and enables a controlled buildup of clamping force. Furthermore, the disk springs 30 are used for maintaining the clamping force, which is also maintained following isolation from the power network.

The clamping force buildup and the height of the clamping force reached are determined over the spring travel, deduced from the revolutions of the electric motor 31.

Furthermore, the slide 25 can be monitored in terms of its position in the released state via the rotary encoder. As a result, the movements to open the slide 25 can be controlled externally and it is also possible to externally monitor whether the workpiece is located in a defined set point zone and thus has the correct size in the clamping direction.

Figure 4A:
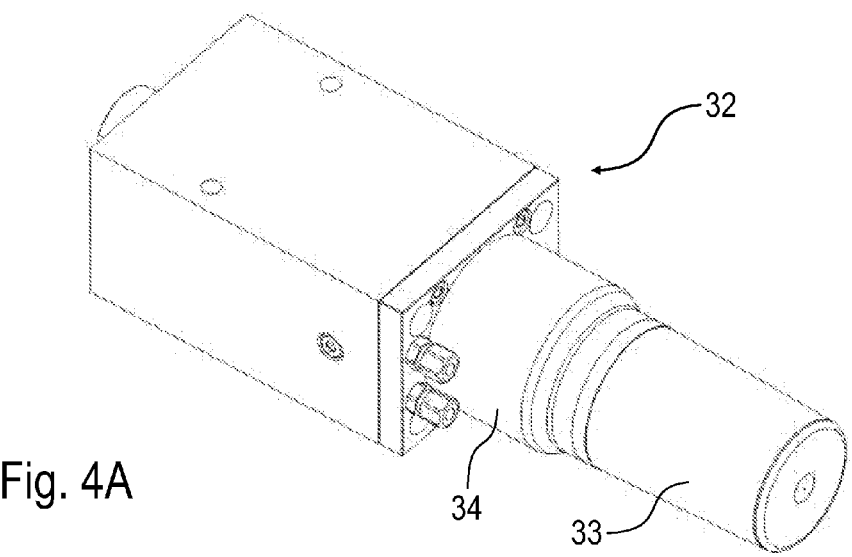
Figure 4B:
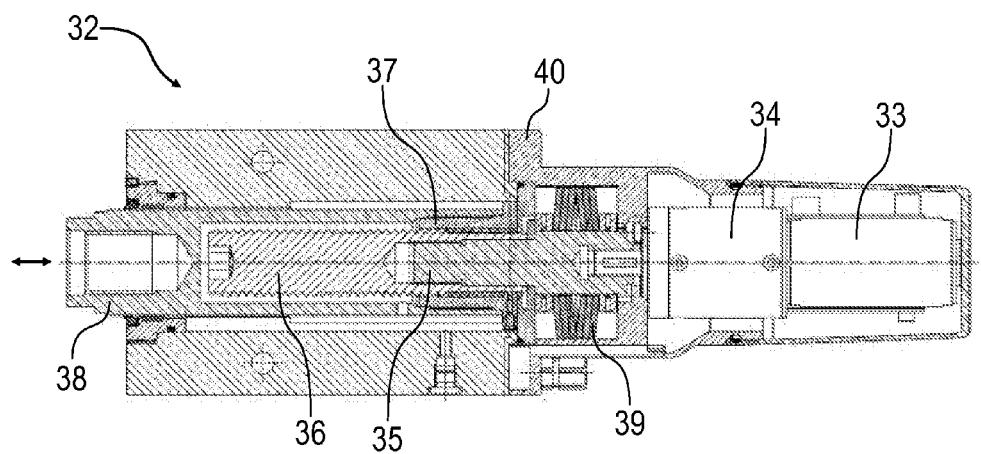

In the following, an electromechanical block cylinder 32 according to the invention is now described, which is illustrated in the FIGS. 4A and 4B.

The drive of the block cylinder 32 takes place via an electric motor 33, downstream of which a gear transmission is connected. The shaft going off at the gear transmission 34 transmits the torque via a shaft/hub connection to a connecting shaft 35 which is connected to the spindle 36. The spindle 36 engages by means of its external thread into a corresponding internal thread of a spindle nut 37, wherein the spindle nut 37 is securely connected to an extendible piston 38. The rotational movement of the shaft of the electric motor 33 is converted via this spindle nut drive into a linear movement of the piston 38, so that the piston 38 can be extended resp. retracted.

During the clamping procedure of the electromechanical block cylinder 32, a workpiece is clamped on a device. Due to the running onto the workpiece, the spindle 36 and thus also the connecting shaft 35 screwed securely thereon are pulled to the right (with respect to FIG. 4B) on the transmission output shaft of the gear transmission 34. Disk springs 39 are pre-stressed during the further buildup of the clamping force. From the certain current consumption level, the control notices the position of the spindle 36 and from there executes a certain number of motor revolutions with reduced rotational speed until the desired clamping force is definedly built up.

Thus, the disk springs 39 take on the function of a force sensor. Furthermore, the disk springs 39 are used for maintaining the clamping force, which also remains following isolation from the power network. A further task of the disk springs 39 is the absorption of the moment of inertia arising in the case of the electric motor 33. In this case, the components are protected from loads which are too large when the piston 38 draws up to the workpiece. The self-locking combination of the spindle 36 and the spindle nut 37 prevents the electric motor 33 from rotating back and thus contributes to the maintenance of the clamping force. The theoretically possible backward rotation of the spindle 36, which is caused by vibration, is corrected by the control if required. The disk springs 39, a needle bearing and a supporting washer enable a clamping procedure both in the pushing direction and in the pulling direction. In this case, the reaction forces are absorbed completely by the housing 40 and not by the electric motor 33.

The invention is not limited to the preferred exemplary embodiments described above. Instead, a plurality of variants and modifications are possible, which also make use of the concept of the invention and thus fall within the scope of protection. Furthermore, the invention also claims protection for the subject-matter and the features of the subclaims independently of the claims to which they refer.

LIST OF REFERENCE SIGNS

1 Swing clamp
2 Piston
3 Housing
4 Guide bushing
5 Felt ring
6 Spindle nut
7 Spindle
8 Sliding block
9 Disk springs
10 Electric motor
11 Washer
12 Motor shaft bushing
13 Deep groove ball thrust bearing
14 Gear transmission
15 Disk springs
16 Support element
17 Piston
18 Electric motor
19 Worm shaft
20 Worm wheel
21 Spindle
22 Machine vice
23 Base body
24 Clamping jaw fixture
25 Slide
26 Exchangeable jaw
27 Exchangeable jaw
28 Spindle
29 Spindle nut
30 Disk springs
31 Electric motor
32 Block cylinder
33 Electric motor
34 Gear transmission
35 Connecting shaft
36 Spindle
37 Spindle nut
38 Piston
39 Disk springs
40 Housing

The invention claimed is:

1. A clamping device comprising
   a) a movable clamping element for clamping a workpiece with a certain clamping force,
   b) an electric motor for mechanically driving the clamping element,
   c) a first spring element which is loaded during a clamping procedure and relaxed during an unclamping procedure, and
   d) a control unit which controls the electric motor, wherein the control unit executes the following steps:
      d1) measuring an electrical operating variable of the electric motor as a measure for the clamping force,
      d2) checking the measured electrical operating variable for a change which is caused by the movable clamping element running onto the workpiece to be clamped,
      d3) switching off the electric motor when a certain clamping force has been reached,
      d4) counting a number of revolutions of the electric motor starting from the running onto the workpiece, and
      d5) calculating the clamping force from the number of revolutions of the electric motor and a predetermined spring characteristic.

2. The clamping device according to claim 1, wherein
   a) the clamping element is moved in a certain clamping direction during the clamping procedure,
   b) the first spring element presses the clamping element either counter to the clamping direction or in the clamping direction with a certain spring force, and
   c) the spring force of the first clamping element is essentially equal to the clamping force which the clamping element exerts on the workpiece.

3. The clamping device according to claim 2, further comprising a second spring element which is loaded during the unclamping procedure and relaxed during the clamping procedure.

4. The clamping device according to claim 3, wherein the second spring element forms a frictionally engaged connection between the electric motor and the clamping element in the case of the unclamping procedure.

5. The clamping device according to claim 4, wherein
   a) the clamping device is a swing clamp,
   b) the swing clamp can be displaced linearly along the clamping direction for clamping or unclamping the workpiece,
   c) the clamping element can be pivoted in an unclamped state,
   d) the frictionally engaged connection between the electric motor and the clamping element effects a pivoting movement of the clamping element.

6. The clamping device according to claim 1, further comprising
   a) an axially slideable piston, which carries the clamping element,
   b) a spindle nut connected to the piston, and
   c) a spindle, which is rotatably driven by the electric motor and engages into the spindle nut and converts a rotational movement of the electric motor into a linear movement of the piston and thus also of the clamping element,
   d) wherein the connection between the spindle nut and the spindle is self-locking.

7. The clamping device according to claim 6, further comprising a sliding control, which only allows one pivoting movement of the clamping element at the start of the clamping procedure and at the end of the clamping procedure and otherwise only allows linear movement of the clamping element.

8. The clamping device according to claim 1, wherein the clamping device is selected from the group consisting of:

a) a swing clamp,
b) a support element,
c) a machine vice,
d) a block cylinder, and
e) a cylinder of some other construction type.

9. The clamping device according to claim 1, wherein the measured electrical operating variable of the electric motor is a motor current.

10. The clamping device according to claim 1, wherein
a) the control unit ends the clamping procedure depending on the measured electrical operating variable of the electric motor, wherein the clamping procedure is ended when the measured electrical operating variable corresponds to the desired clamping force, and
b) the control unit ends the unclamping procedure depending on the measured electrical operating variable of the electric motor, wherein the unclamping procedure is ended when the measured electrical operating variable corresponds to a desired friction force of the frictionally engaged connection between the electric motor and the clamping element.

11. The clamping device according to claim 1, wherein the first spring element and the second spring element have at least one disk spring.

12. The clamping device according to claim 1, further comprising
a) a structurally integrated current storage device for network independent power supply of the electric motor, and
b) a printed circuit board, on which the control unit is arranged, wherein the printed circuit board is folded around the electric motor.

13. The clamping device according to claim 1, wherein the clamping device
a) only operates in a pulling manner or
b) only operates in a pushing manner or
c) operates in a pulling and pushing manner.

14. The clamping device according to claim 1, further comprising an output for outputting the clamping force or the clamping path, which is deduced from the measured electrical operating variable.

15. A control method for a clamping device comprising a movable clamping element for clamping a workpiece, an electric motor for mechanically driving the clamping element, a first spring element, which is loaded during a clamping procedure and relaxed during an unclamping procedure, and a control unit for controlling the electric motor, said method comprising the following steps:
a) detecting an electrical operating variable of the electric motor as a measure for a clamping force,
b) checking the measured electrical operating variable for a change which is caused by the movable clamping element running onto the workpiece to be clamped,
c) switching off the electric motor when a certain clamping force has been reached,
d) counting a number of revolutions of the electric motor starting from the running onto the workpiece, and
e) calculating the clamping force from the number of revolutions of the electric motor and a predetermined spring characteristic.

16. The control method according to claim 15, wherein the clamping device is a swing clamp and the following steps are executed during the clamping procedure:
a) starting the electric motor with a low rotational speed for pivoting the clamping element into a clamping position, utilizing a frictionally engaged connection between the electric motor and the clamping element, and
b) operating the electric motor with a low rotational speed for releasing a frictionally engaged connection between the electric motor and the clamping element, and
c) measuring the electrical operating variable of the electric motor during the clamping procedure, and
d) checking whether the measured electrical operating variable indicates that the frictionally engaged connection between the electric motor and the clamping element released, and
e) increasing the rotational speed of the electric motor when the frictionally engaged connection between the electric motor and the clamping element is released, and
f) measuring the electrical operating variable of the electric motor during the clamping procedure, and
g) checking whether the measured electrical operating variable indicates that the clamping element has run onto the workpiece, and
h) reducing the rotational speed of the electric motor if the clamping element has run onto the workpiece,
i) straining the first spring element, and
j) measuring the electrical operating variable of the electric motor during the clamping procedure, and
k) checking whether the measured electrical operating variable indicates that the desired clamping force has been reached, and
l) switching off the electric motor if the desired clamping force has been reached.

17. The control method according to claim 15, wherein the clamping device is a swing clamp and the following steps are executed during the unclamping procedure:
a) starting the electric motor with a low rotational speed for reducing the clamping force, and
b) measuring the electrical operating variable of the electric motor during the unclamping procedure, and
c) checking whether the measured electrical operating variable indicates that the clamping force is decreased, and
d) increasing the rotational speed of the electric motor if the clamping force is decreased, and
e) measuring the electrical operating variable of the electric motor during the unclamping procedure, and
f) increasing the frictional engagement between the electric motor and the clamping element by straining the second spring element, and
g) pivoting the clamping element into the unclamping position with a low rotational speed, and
h) further increasing the frictional engagement between the electric motor and the clamping element, and
i) checking whether the measured electrical operating variable indicates that the frictionally engaged connection between the electric motor and the clamping element has a desired friction force, and
j) switching off the electric motor if the desired friction force has been reached.

18. The control method according to claim 15, wherein the clamping device is a block cylinder and the following steps are executed during the clamping procedure:
a) starting the electric motor with a low rotational speed for releasing a frictionally engaged connection between the electric motor and the clamping element, and
b) measuring the electrical operating variable of the electric motor during the clamping procedure, and
c) checking whether the measured electrical operating variable indicates that the frictionally engaged connection between the electric motor and the clamping element released, and d) increasing the rotational speed of the electric motor when the frictionally engaged connection between the electric motor and the clamping element is released, and e) measuring the electrical operating variable of the electric motor during the clamping procedure, and f) checking whether the measured electrical operating variable indicates that the clamping element has run onto the workpiece, and g) reducing the rotational speed of the electric motor if the clamping element has run onto the workpiece, and h) straining the spring element, and i) measuring the electrical operating variable of the electric motor during the clamping procedure, and j) checking whether the measured electrical operating variable indicates that the desired clamping force has been reached, and k) switching off the electric motor if the desired clamping force has been reached.

19. The control method according to claim 15, wherein the clamping device is a block cylinder and the following steps are executed during the unclamping procedure:

a) starting the electric motor with a low rotational speed for reducing the clamping force, and b) measuring the electrical operating variable of the electric motor during the unclamping procedure, and c) checking whether the measured electrical operating variable indicates that the clamping force is decreased, and d) increasing the rotational speed of the electric motor if the clamping force is decreased, and e) measuring the electrical operating variable of the electric motor during the unclamping procedure, and f) straining the spring element, and g) measuring the electrical operating variable of the electric motor during the unclamping procedure, and h) checking whether the measured electrical operating variable indicates that a desired unclamping force has been reached, and i) switching off the electric motor if the desired unclamping force has been reached.

20. The control method according to claim 15, wherein the clamping device is a machine vice and the following steps are executed during the clamping procedure:

a) starting the electric motor with high rotational speed, and b) measuring the electrical operating variable of the electric motor during the clamping procedure, and c) checking whether the measured electrical operating variable indicates that the clamping element has run onto the workpiece, and d) reducing the rotational speed of the electric motor if the clamping element has run onto the workpiece, and e) straining the spring element, and f) measuring the electrical operating variable of the electric motor during the clamping procedure, and g) checking whether the measured electrical operating variable indicates that a desired clamping force has been reached, and h) switching off the electric motor if the desired clamping force has been reached.

21. The control method according to claim 15, wherein the clamping device is a machine vice and the following steps are executed during the unclamping procedure:

a) starting the electric motor with a low rotational speed for reducing the clamping force, and b) measuring the electrical operating variable of the electric motor during the unclamping procedure, and c) checking whether the measured electrical operating variable indicates that the clamping force is decreased, and d) increasing the rotational speed of the electric motor if the clamping force is decreased, and e) measuring the electrical operating variable of the electric motor during the unclamping procedure, and f) traveling into the unclamping position, defined via a path resp. by a limit switch, switching off the electric motor.

22. The control method according to claim 15, wherein the clamping device is a support element and the following steps are executed during the clamping procedure:

a) starting the electric motor with high rotational speed, and b) measuring the electrical operating variable of the electric motor during a setup procedure, and c) reducing the rotational speed of the electric motor when the advance switching position is reached, and d) measuring the electrical operating variable of the electric motor during the setup procedure, and e) checking whether the measured electrical operating variable indicates that the clamping element has run onto the workpiece, if so, immediate switching off of the electric motor, and f) checking whether the friction coupling has responded, if so, immediate switching off of the electric motor.

23. The control method according to claim 15, wherein the clamping device is a support element and the following steps are executed during the unclamping procedure:

a) starting the electric motor with high rotational speed for reducing the contact force, and b) measuring the electrical operating variable of the electric motor during the unclamping procedure, and c) traveling into the unclamping position, defined by a limit switch, switching off the electric motor.

24. The control method according to claim 15, further comprising the following step: re-adjusting the clamping force in a clamped state.

* * * * *